Figure 1:
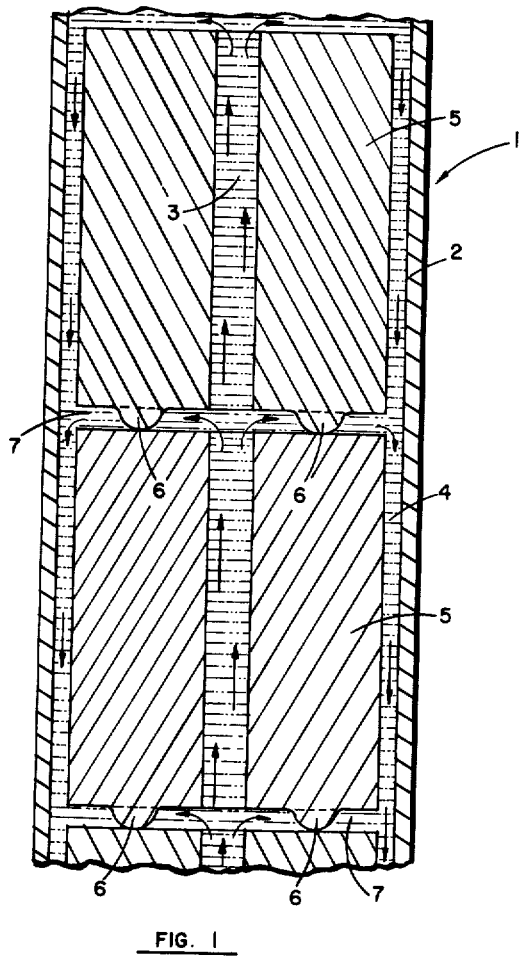

April 3, 1962

J. E. MAHLMEISTER 3,028,329

NUCLEAR REACTOR FUEL ELEMENT WITH IMPROVED
HEAT TRANSFER CHARACTERISTICS

Filed Nov. 13, 1958

INVENTOR.
JAMES E. MAHLMEISTER

BY Gerald A. Karis

ATTORNEY

United States Patent Office 3,028,329
Patented Apr. 3, 1962

3,028,329
NUCLEAR REACTOR FUEL ELEMENT WITH IMPROVED HEAT TRANSFER CHARACTERISTICS
James E. Mahlmeister, Granada Hills, Calif., assignor, by mesne assignments, to the United States of America as represented by the United States Atomic Energy Commission
Filed Nov. 13, 1958, Ser. No. 773,768
4 Claims. (Cl. 204—193.2)

My invention relates to an improved nuclear reactor fuel element and more particularly to a fuel element with improved heat transfer characteristics.

A limiting factor in the power obtainable from a given nuclear reactor fuel is the maximum temperature the fuel elements of the reactor can safely reach. The maximum center temperature at which the fuel element can operate is in turn set by metallurgical limitations such as melting point or unprohibitive swelling. With the maximum center temperature set, other portions of the fuel element operate at correspondingly lower temperatures. For a given cladding temperature and thermal conductivity of fuel, the power density is essentially limited when the energy transfer mechanism is principally by heat conduction with low conductivity ceramic fuels. This power limitation requires very large reactors to meet the power requirements with associated high power costs.

To extract the maximum possible heat from a given quantity of fuel, the art has heretofore employed fuel elements with high surface to volume ratio. Such elements have employed thin plates, rods, or pins. However, the basic problem still remains and has indeed become aggravated with the advent of ceramic type fuel compositions, which have heat transfer characteristics inferior to those of the metals. Ceramic fuels, such as uranium dioxide, are finding favor because of the high burnup which can be obtained before reprocessing. Since $UO_2$ does not undergo the alpha-beta phase transition of uranium metal (1,225° F.), high power densities would be possible if the fuel elements were designed to take the high temperatures, thermal gradients and thermal strains associated with high power ratings. These conditions of operation are primarily due to the fact that the controlling thermal resistance is in the uranium slug and that $UO_2$ has a low thermal conductivity. This requires larger size reactors to extract a given amount of power and the resulting increased capital costs must be weighed against the lower fuel costs resulting from higher burnup. Improving the operating characteristics of fuel elements, by obtaining higher power densities and power release through uniform fuel temperatures, would contribute significantly to achieving economic nuclear power.

An object of my present invention, therefore, is to provide an improved fuel element for a nuclear reactor.

Another object is to provide a fuel element for a nuclear reactor capable of operating at higher average power density and temperature.

Another object is to provide such a fuel element with improved internal heat transfer characteristics.

Figure 3:
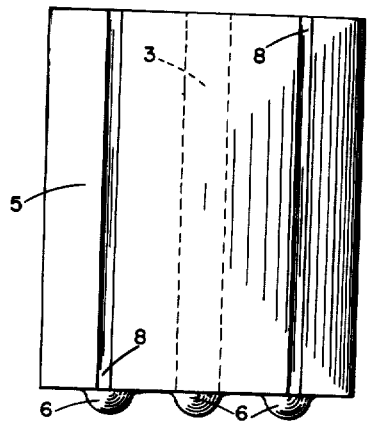
Figure 4:
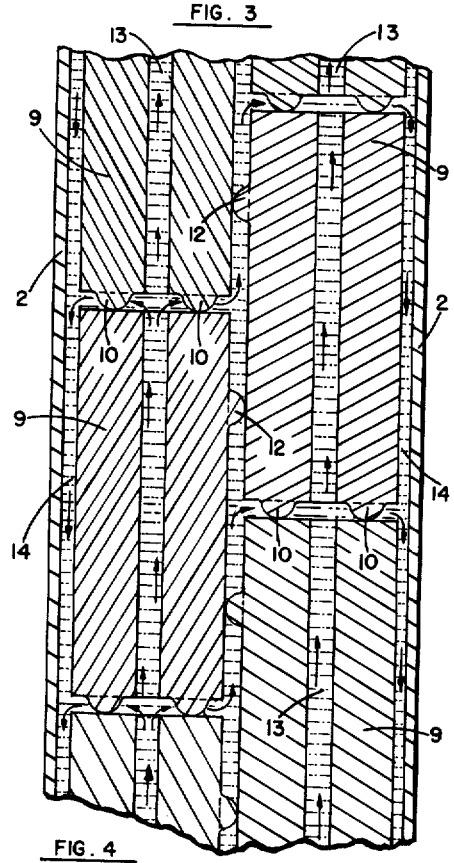
Figure 2:
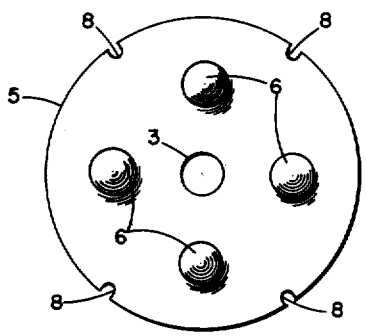

The above and other objects and advantages of my invention will become apparent from the following detailed description taken together with the appended claims and the accompanying drawings. In the drawings, FIGURE 1 is a partial vertical section of one embodiment of my fuel element. FIGURE 2 is an elevation of a portion of the same fuel element, and FIGURE 3 is a plan view. FIGURE 4 is a partial vertical section of another embodiment of my invention.

Turning now to the drawings, the fuel element unit 1 shown is in the form of a cylindrical rod. The tubular container 2 for the fuel may be satisfactorily composed of any metal or alloy with satisfactory high temperature (in the region of 1000° F.) strength and corrosion resistance. Most metals and alloys meet these requirements, and organic and sodium coolants are particularly non-corrosive. "Container," as used herein, is intended to have such meaning. The cladding metal should be thin (e.g., 10 mils), to allow use of materials of appreciable thermal neutron absorpition cross section such as stainless steel, although low cross section metals are preferable. Satisfactory examples which have heretofore been used as a fuel element cladding are stainless steel, and aluminum, magnesium and zirconium and their alloys such as zircalloy (1.5% tin) and aluminum-aluminum oxide (<10% $Al_2O_3$). Titanium, tungsten and inconel (chromium-nickel alloy) can also be used.

The fuel portion 5 has a central, axial core 3 running through it. An annulus 4 is provided between the exterior surface of the fuel and the container wall. This allows an internal heat transfer medium to circulate by convection flow between the center of the fuel and the container walls. Still further improved heat transfer from the fuel may be obtained by having the fuel rod composed of a plurality of such ring-shaped segments 5, the cores of the successive segments being in axial alignment. The bottom of each segment has pedestals 6 or other spacer means between the segments, adapted to allow radial flow from the axial core to the container wall through the radial channels 7 defined by pedestals 6, in the manner indicated by the arrows. Elevation and plan views of the pedestals are seen in FIGURES 2 and 3.

Particularly when ceramic fuel compositions with poor heat transfer properties are employed, temperature differentials will exist radially across the fuel slugs. The resulting thermal strains may fracture the slugs during operation. In order to usefully direct the fracture, a number of grooves, preferably perimetrical axial grooves 8, are made along the slug surface, as shown in FIGURES 2 and 3. This causes high stress concentrations for the tangential stresses which are present, and radial cracks occur to form "pie sections." The resulting sections provide additional radial cooling area between the slug center and exterior for the internal coolant fluid. In this manner, fracturing of ceramic slugs will not be detrimental, but rather beneficial to fuel performance. Furthermore, axial grooves 8 provide positive flow area in the event of annulus blockage due to crumbling of the ceramic under irradiation.

The fuel core is not limited in selection to any particular fuel composition, and "fuel" is used herein in such a sense. Examples are uranium and plutonium metals and alloys, such as thorium-uranium, thoria-urania, uranium-molybdenum, plutonium-uranium, and the ceramic compositions of uranium and plutonium, such as the uranium oxides, particularly $UO_2$ and uranium carbide. While my invention gives improved heat transfer characteristics to any of the above compositions, it is particularly effective when employed with a ceramic, such as $UO_2$, of low thermal conductivity.

The internal heat transfer fluid is similarly subject to wide variation. Molten inorganic media generally can be used, particularly molten metals and alloys. These are stable at elevated temperatures (e.g., 1000° F.), are of low vapor pressure, and have density vs. temperature characteristics suitable for convective flow. While not essential, since the price, as with the container, is primarily one of uranium enrichment, the metal should not be of too appreciable cross section, and preferably of low cross section. Satisfactory examples are alkali metals such as sodium, potassium and alloys thereof such as sodium-potassium, lead, tin, lead-tin, bismuth, bismuth-lead, and bismuth-tin. Sodium-potassium is particularly satisfactory with uranium metal, uranium carbide, and uranium metal alloys such as uranium-thorium, while lead is especially satisfactory with uranium dioxide and uranium dioxide-thorium dioxide. Stable molten salts, particularly fluorides and alkali fluorides such as NaF, KF, and mixtures thereof, may also be used.

Another embodiment of my invention is shown in FIGURES 4 and 5. The individual fuel pellets 9 are ring shaped and are in staggered relationship in the tube for improved coolant circulation. The pellets are approximately one-half the diameter of the tube. The pellets have similar bottom pedestals 10 and perimeter grooves as the pellets of the earlier embodiment, and also have spacer means 12 (protuberances or the like) between each pellet. The pellets are ring-shaped with an axial central channel 13 for coolant flow. This arrangement allows coolant flow through, around, and between each pellet and the annulus 14 as indicated by the arrows.

In still another embodiment, the tubular fuel units shown in FIGURES 1–5 can be used in a double concentric tube arrangement, that is, one tube inside another similar, but larger unit, to form a composite fuel assembly.

If the fuel employed is a metal or metal alloy, the central core and pedestal portion of each segment may be machined or cast into the desired shape. If a ceramic such as uranium oxide is employed, coring the slug, forming pedestals, and applying perimeter axial grooves, may be done during sintering or hot pressing operation in a mold, which is commonly employed to compact $UO_2$ particles together and increase their density.

A fuel element of my design is particularly suited for use in a sodium-cooled reactor, such as the Sodium Reactor Experiment reactor (SRE), described in the paper of W. E. Parkins in "The Proceedings of the Conference on the Peaceful Uses of Atomic Energy." In view of the excellent heat transfer characteristics and low vapor pressure of sodium, high heat fluxes (1,000,000 B.t.u./hr./ft.$^2$) can be removed from the surface of a fuel element without large temperature differences. An example of improvements which my invention allows is shown by the following fuel element for the SRE. This element comprises a 19-rod cluster of the fuel tubes shown in FIGURE 1. Each rod comprises 0.36 inch diameter $UO_2$ slugs in a lead bonded, stainless steel tube. Each rod is 6 feet long, has ⅛ inch central channel, ⅟₁₆ inch pedestal height, 10 mil outer annulus, a length to diameter ratio per pellet of 1 to 2, and the tubular container is 10 mil, Type 304 stainless steel. The $UO_2$ is 8% enriched in U–235 and has a density of 10.2 gms./cc. The top and bottom fixtures of the element are the same as those of the present SRE element. This fuel element is functionally (physics-wise) and exact replacement for the present SRE element, and the reactor can operate with the same fuel element loading. The maximum internal fuel temperature is 3600° F. with 1200° F. surface temperature and 800° F. cladding temperatures. With this arrangement, 15–20 kw./ft. power output is obtained, as compared to 7–8 kw./ft. with a conventional, solid $UO_2$ slug.

It should be understood that the above example is only illustrative, and not restrictive of my invention, which is inherently broad. My invention is limited, therefore, only as indicated in the following claims.

I claim:

1. A nuclear reactor fuel element comprising a metal container, a plurality of fuel segments in said container, the exterior said segments and said container defining an annulus, each said segment having a central axial channel, spacer means between successive segments connecting said central channels with said annulus, a plurality of axial grooves on the exterior surface each said segment, and a molten metal circulating between said central channel and said container.

2. The fuel element of claim 1, wherein said spacer means comprise pedestals extending from said fuel segments.

3. A nuclear reactor fuel element comprising a tubular metal container, a plurality of aligned fuel segments positioned in said container, the exterior said fuel and said container defining an annular space, an axial channel in each segment, said successive channels being in axial alignment, spacer means between said segments to provide radial channels connecting said axial channels and said annulus, a plurality of axial grooves on the exterior each said segment, and a molten metal circulating between said annulus and said aligned axial channels.

4. The fuel element of claim 3, wherein said container is stainless steel, said fuel is uranium dioxide, and said molten metal is lead.

References Cited in the file of this patent

UNITED STATES PATENTS

| | | |
|---|---|---|
| 2,798,848 | Kingdon | July 9, 1957 |
| 2,799,642 | Hurwitz et al. | July 16, 1957 |
| 2,830,944 | Wigner et al. | Apr. 15, 1958 |
| 2,832,733 | Szilard | Apr. 29, 1958 |
| 2,838,452 | West et al. | June 10, 1958 |
| 2,852,456 | Wade | Sept. 16, 1958 |
| 2,852,460 | Abbott et al. | Sept. 16, 1958 |
| 2,853,446 | Abbott et al. | Sept. 23, 1958 |
| 2,856,340 | Wigner et al. | Oct. 14, 1958 |
| 2,865,826 | Stewart | Dec. 23, 1958 |
| 2,879,216 | Hurwitz et al. | Mar. 24, 1959 |

FOREIGN PATENTS

| | | |
|---|---|---|
| 1,141,542 | France | May 27, 1958 |
| 199,282 | Australia | Aug. 25, 1958 |